United States Patent
Bashir et al.

(10) Patent No.: US 10,066,067 B2
(45) Date of Patent: Sep. 4, 2018

(54) POLYESTER SHEET

(71) Applicant: SABIC Global Technologies B.V., Bergen op Zoom (NL)

(72) Inventors: Zahir Bashir, Riyadh (SA); Rajiva Joshi, Riyadh (SA); Azzedine Kioul, Riyadh (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/738,778

(22) PCT Filed: Jun. 3, 2016

(86) PCT No.: PCT/EP2016/062598
§ 371 (c)(1),
(2) Date: Dec. 21, 2017

(87) PCT Pub. No.: WO2017/001145
PCT Pub. Date: Jan. 5, 2017

(65) Prior Publication Data
US 2018/0179349 A1     Jun. 28, 2018

Related U.S. Application Data

(60) Provisional application No. 62/309,596, filed on Mar. 17, 2016.

(30) Foreign Application Priority Data

Jun. 29, 2015   (EP) ..................................... 15174274

(51) Int. Cl.
*C08J 5/18* (2006.01)
*B65D 1/30* (2006.01)

(52) U.S. Cl.
CPC ..................... *C08J 5/18* (2013.01); *B65D 1/30* (2013.01); *C08J 2367/02* (2013.01)

(58) Field of Classification Search
CPC ............ C08J 5/18; C08J 2367/02; B65D 1/30
See application file for complete search history.

(56) References Cited

U.S. PATENT DOCUMENTS

| | | |
|---|---|---|
| 4,064,112 A | 12/1977 | Rothe et al. |
| 4,161,578 A | 7/1979 | Herron |
| 4,451,606 A | 5/1984 | Campbell |
| 4,537,738 A | 8/1985 | Holmes |
| 5,820,953 A | 10/1998 | Beer et al. |
| 5,886,088 A | 3/1999 | Matsumoto et al. |
| 2003/0230582 A1 | 12/2003 | Whitmore et al. |
| 2009/0321292 A1 | 12/2009 | Prudden, Jr. et al. |

FOREIGN PATENT DOCUMENTS

WO     2011060001 A1    5/2011

OTHER PUBLICATIONS

International Search Report for International Application No. PCT/EP2016/062598; International Filing Date: Jun. 3, 2016; dated Aug. 5, 2016; 6 Pages.
Klockner Pentaplast Press Release; Klockner Pentaplast Introduces New PET-Based Technology for Yogurt Packaging at Propack Africa 2016; Mar. 3, 2016.
Klockner Pentaplast: Pentafood clickPet; Presented at Conference dated Mar. 15, 2016.
Written Opinion of the International Searching Authority for International Application No. PCT/EP2016/062598; International Filing Date: Jun. 3, 2016; dated Aug. 5, 2016; 6 Pages.

*Primary Examiner* — Michael C Miggins
(74) *Attorney, Agent, or Firm* — Cantor Colburn LLP

(57) ABSTRACT

The present invention relates to a polyester sheet comprising a crystallized portion, said crystallized portion being in the form of one or more strip extending along at least a portion of the polyester sheet. The present invention further relates to a method for the manufacture of such sheet and use of such sheet.

16 Claims, No Drawings

POLYESTER SHEET

CROSS REFERENCE TO RELATED APPLICATIONS

This application is a 371 of International Application No. PCT/EP2016/062598, filed Jun. 3, 2016, which claims priority to U.S. Application Ser. No. 62/309,596, filed Mar. 17, 2016 and European Application No. 15174274.9, filed Jun. 29, 2015 which are incorporated herein by reference in their entirety.

The present invention relates to a polyester sheet and a process for making the same. The present invention further relates to the use of such sheet in packaging such as packaging of food.

Packaging of food, for example fruit yoghurts and flavoured yoghurts, is frequently in 4, 6 and 8 cup packages. This consists of 4, 6, 8 cups made by thermoforming and connected by webbing such that the cups are separable upon bending. This allows the consumer to pick up a pack of 4, 6 and 8 cup as a whole, but when consuming, the consumer may readily break off one or two at a time. Typically, the material used for the packaging is a mixture of general purpose polystyrene (GPPS) and high impact polystyrene, typically in a combination of about 60:40 ratio by weight. GPPS is atactic polystyrene.

Pure atactic polystyrene would be advantageous in terms of transparency, but the material is too brittle, and would break if a cup made of GPPS is dropped. GPPS blended with a special refractive-index matched rubber can give transparency and snappability but it is very expensive because of the special rubber. Special grades of high impact polystyrene (HIPS) can be used for snappable cups but they are hazy. The combination of GPPS and HIPS gives a 4, 6 and 8 cup package which can be lifted by a consumer without the need of a cardboard support, which is snappable individually, and which would survive a drop without bursting and spillage of the contents. HIPS-GPPS mixture however has deficiencies that it is opaque and is still expensive.

PP and PE are thermoformable and are less expensive than HIPS-GPPS, but are not snappable. PP in particular is known to form durable living hinges, and snapping along the webbing connecting the cups is impossible even when grooving is made.

Hence, an alternative to existing materials is sought that is cost efficient and allows 4, 6, 8 cup to be liftable as a whole without breaking under its own weight, and therefore does not need to be encased in cardboard. Further, the webbing connecting the cups should be snappable on bending along its axis, allowing each cup to be manually detached with ease. Separation by tearing is more difficult and the handling requires risks of breaking the lidding of the cups. Separation by snapping on bending along the bridging webs is therefore the most desired solution.

It is an objective of the present invention to provide an article in which the above-described and/or other problems are solved.

Accordingly, the present invention provides a polyester sheet comprising a crystallised portion, said crystallised portion being in the form of one or more strip extending along at least a portion of the polyester sheet.

The crystallised portion is herein understood to mean a portion of a heat induced crystallised polyester. Such heat induced crystallised polyester portions usually have a white appearance (for polyesters without any colorants or color additives that affect the color of the polyester). The present inventors surprisingly found out that a crystallised polyester is brittle and is snappable upon bending. The crystallisation of the crystallised portion in the polyester sheet according to the invention is induced by heating to a crystallisation temperature without subjecting the portion to stretching. The crystallised polyester of the crystallised portion in the polyester sheet according to the invention is spherulitically crystallised. Unlike the crystallised polyester, polyester with low or no crystallinity has a transparent appearance. Hence, the determination of whether a portion is crystallised or not can be visually performed. For example, the portion can be determined as crystallised and has become brittle if its haze is 99-100% and the transmission value is below 50%. The determination of the haze and transmission values can be carried out in accordance with the standard ASTM D1003.

The white appearance of the crystallised portion can be distinguished from the white appearance obtained by additives such as colorants in that upon melting of the crystallised portion, said portion becomes transparent. In contrast, if the whitening is due to additives, the melt would remain white. The determination of whether the portion is crystallised can also be made by determining the presence of spherulites in the crystallised portion by microscope.

The crystallised portion may have a density of at least 1.3720 g/cm$^3$, for example at least 1.3720-1.3800 g/cm$^3$.

A pure amorphous PET (APET) sheet is very tough, even when a fold or crease is created. Folding and creasing in fact leads to a 'living hinge'. This is well known and is used to make thermoformed PET egg trays with foldable hinges. Such a hinged fold in APET has a high fatigue resistance and requires many folding attempts before it becomes breakable. In one application, a lifting ring made of APET is attached to a large PET bottle. It consists of a ring that goes around the bottle neck with an extending web that leads to a second ring for finger insertion during lifting. The connecting web is thinned and flexed to make it into a hinge; thereafter the APET ring will not snap off when lifting the bottle.

The fact that crystallised polyester is brittle is surprising in view of the behaviour of other polymers such as polyethylene (PE) and polypropylene (PP). Thermally crystallised PE or PP forms spherulites. This is the reason products from these polymers are white or translucent. However, thermally crystallised, spherulitic PE or PP articles are not brittle. It is also known that to embrittle PP in an impact test, the spherulites have to be large (10 micron or larger). However, even these show hinging behavior on bending. Using nucleating agents in PP leads to spherulites that are about 1 micron in diameter. The smaller size toughens the spherulitically crystallised PP.

PET spherulites induced by heat are generally small (1-2 microns in diameter). Although these spherulites are small, it was found here that their presence surprisingly causes embrittlement and cracking on bending.

Sheet Structure

The term 'sheet' is herein understood to mean an article having a small thickness relative to the dimensions perpendicular to the thickness direction. When the thickness of the sheet is small, e.g. smaller than 250 µm, the sheet may also be called a film. The sheet may be of any form, such as extending in two dimensions in the form of a plane, or have drawn portions which may be used as receiving portions for receiving food such as yoghurt.

Preferably, the crystallized portion has a haze of 99-100% and a transmission value of below 50%, more preferably below 45%, such as 40-45%.

Preferably, the sheet further has a portion which has a haze less than 99% and/or a transmission value of at least 50% (herein sometimes referred as a non-brittle portion).

The non-brittle portion may include a portion which has been formed by a process involving stretching (e.g. thermoforming), such as cup walls.

Preferably, the crystallinity of the crystalllised portion, i.e. the strip, is at least 10%, more preferably at least 20%, more preferably at least 30%, more preferably at least 35%. Preferably, the crystallinity of the non-brittle portion, i.e. the portion not being the strip, is at most 5%, more preferably at most 3%, more preferably at most 2%, more preferably at most 1%. Most preferably the polyester sheet, except for the strip, is amorphous.

The % degree of crystallinity $X_c$ can be calculated from density according to the following equation 1:

$$X_c=(\rho_c/\rho_{sample})\times(\rho_{sample}-\rho_a)/(\rho_c-\rho_a)\times 100$$

The most commonly used values for $\rho_c$ and $\rho_a$ are from R. de P. Daubeny, C. W. Bunn and C. J. Brown, Proceedings of the Royal Society, A 226, 531 (1954). From their X-ray crystal work, $\rho_c=1.455$ g/cm$^3$ for 100% crystalline PET. $\rho_a=1.333$ g/cm$^3$ for the density of 100% amorphous PET from density column measurements. Note that higher values of $\rho_c$ have been cited by some researchers, but the above value of $\rho_c$ is the most common reference value. Hence, as used herein, $\rho_c=1.455$ g/cm$^3$ and $\rho_a=1.333$ g/cm$^3$. A higher value of $\rho_c$ reduces the absolute value of the crystallinity. Hence, the density of the sample will be taken as a measured indicator of the brittleness.

The sheet according to the invention may have a thickness of e.g. 100-5000 μm, preferably 500-1000 μm. The thickness of the sheet is herein understood as the largest thickness of the non-brittle portion.

Preferably, in the sheet according to the invention, the strip has a width of 0.1-10 mm, more preferably 1-5 mm.

Preferably, in the sheet according to the invention, the strip has a thickness of 100-2000 μm, more preferably 600-800 μm.

The strip may be in any form. The strip may e.g. be in the form of a straight or a curved line extending between one side of the sheet to another side of the sheet. The strip may e.g. be in the form of a circle. The sheet may have more than one strip, for example a plurality of parallel strips along the machine direction of the sheet and a plurality of parallel strips in the transverse direction, which together would form a grid.

The non-brittle portion and the crystallised portion of the sheet may have same thicknesses or different thicknesses. Preferably, the crystallised portion of the sheet has a smaller thickness than the non-brittle portion, i.e. the crystallised portion forms a groove in the sheet.

To further enhance the ease of snapping the sheet, the crystallised portion(s) may be provided with weakening means selected from the group consisting of perforations, scores, grooves and combinations of the foregoing weakening means. This weakening means reducing the strength of the crystallised portion.

In some embodiments, the crystallised portion is not provided with weakening means.

Polyester Composition

Polyesters are essentially linear polymeric molecules containing ester groups in their chemical structure and are known to be truly versatile materials, being commonly used as fibers, plastics and sheets; in composites and elastomers; and as coatings. The production of polyesters by condensation of polyfunctional carboxylic acids with polyfunctional alcohols (or their ester-forming derivatives) is well known in the art, and is described in e.g. Encyclopaedia of Polymer Science and Engineering, 2$^{nd}$ ed., volume 12, John Wiley and Sons, New York, 1988. The most common polyester is polyethylene terephthalate (PET); this polyester is the cheapest and is industrially produced on a large scale. It is mainly used in industry for production of textile fibres, filaments, sheets and bottles.

The polyester according to the present invention may be a crystallisable polyester derived from at least one alcohol-based compound and at least one carboxylic acid-based compound.

The carboxylic acid-based compound may be a carboxylic acid or an ester-forming derivative thereof, like an ester, especially an alkyl- or hydroalkyl-ester, or acid chloride. Preferably, a dicarboxylic acid of the formula HOOC—R—COOH, wherein R is a—linear or branched—alkyl group, an arylene group, an alkenylene group or a combination thereof is used as carboxylic acid-based compound. Preferably, R has about 2 to 30, preferably about 4 to 15 carbon atoms. Suitable examples of carboxylic acid compounds may include saturated aliphatic dicarboxylic acids such as oxalic acid, malonic acid, succinic acid, gluratic acid, adipic acid, pimelic acid, suberic acid, azelaic acid, sebacic acid, decanedicarboxylic acid, dodecanedicarboxylic acid, tetradecanedicarboxylic acid, hexadecanedicarboxylic acid, 3-cyclobutanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 2,5-norbornanedicarboxylic acid, and dimeric acid; unsaturated aliphatic dicarboxylic acids such as fumaric acid, maleic acid, and itaconic acid; and aromatic dicarboxylic acid such as orthophthalic acid, isophthalic acid, terephthalic acid, 5-(alkali metal)sulfoisophthalic acid, diphenic acid, 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, 4,4-biphenyldicarboxylic acid, 4,4'-biphenylsulfonedicarboxylic acid, 4,4'-biphenyl ether dicarboxylic acid, 1,2-bis(phenoxy)ethane-p,p'-dicarboxylic acid, pamoic acid, and anthracenedicarboxylic acid. Other dicarboxylic acids, and minor amounts of polycarboxylic acids or hydroxycarboxylic acids may also be used as constituent components.

More preferably, the carboxylic acid-based compound is at least one compound selected from the group comprising terephthalic acid, isophthalic acid, naphthalenic diacid, succinic acid, adipic acid, phthalic acid, glutaric acid, oxalic acid, and maleic acid. Most preferably, the carboxylic acid compound is terephthalic acid.

The alcohol-based compound may be a hydroxy-functional compound or an ester-forming derivative thereof, like an ester of a lower aliphatic carboxylic acid, such as acetic acid. Preferably, the alcohol-based compound is a bi-functional alcohol, like an alkylene glycol of the formula HO—R'—OH, a polyalkylene glycol having the formula HO—[R"—O—]$_n$—H or combinations thereof, wherein R' is an alkylene group, linear or branched, having 2 to about 10, preferably 2 to 4 carbon atoms, and wherein R", being the same or different, is an alkylene group having 1 to about 10, preferably 1 to 5 carbon atoms. Suitable examples of the alcohol-based compound include aliphatic glycols such as ethylene glycol, 1,2-propylene glycol, 1,3-propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, 1,10-decamethylene glycol, 1,12-dodecanediol, polyethylene glycol, polytrimethylene glycol, and polytetramethylene glycol; and aromatic glycols such as hydroquinone, 4,4'-dihydroxybisphenol, 1,4-bis(P-hydroxyethoxy)benzene, 1,4-bis(-hydroxyethoxyphenyl)sulfone, bis(p-hydroxyphenyl)ether, bis(p-hydroxyphenyl)sulfone, bis(p-hydroxyphenyl)methane, 1,2-bis(p-hydroxyphenyl)ethane, bisphenol A, bisphenol C, 2,5-naphthalenediol, and glycols obtained by adding ethylene oxide to these glycols. Preferably, the alcohol-based compound is at least one compound selected from the group comprising ethylene glycol, 1,3-propylene glycol, 1,4-butylene glycol, and 1,4-cyclohexanedimethanol; and more preferably, ethylene glycol.

Small amounts of polyhydric alcohols may also be used in combination with these glycols. Suitable examples of polyhydric alcohols are trimethylolmethane, trimethylolethane, trimethylolpropane, pentaerythritol, glycerol, and hexanetriol. The hydroxycarboxylic acids may also be used in combination. Examples of hydroxycarboxylic acids may include lactic acid, citric acid, malic acid, tartaric acid, hydroxyacetic acid, 3-hydroxybutyric acid, p-hydroxybenzoic acid, p-(2-hydroxyethoxy)benzoic acid, 4-hydroxycyclohexanecarboxylic acid and their ester-forming derivatives. Also, cyclic esters in combination may be used in present invention. Examples of cyclic esters include e-caprolactone, beta-propiolactone, -methyl-p-propiolactone d-valerolactone, glycollide, and lactide.

The initial molar ratio of the carboxylic acid-based compound and the alcohol-based compound may be in the range of about 1:1 to about 1:3, preferably 1:1.2 to 1:2. Optimum ratio generally depends on reaction temperatures and time.

Terephthalic acid and ethylene glycol are the most preferred starting compounds for the polyester, according to the present invention.

Any suitable comonomer may be optionally contained in the polyester, such as isophthalic acid; 1, 4-cyclohexane dimethanol; branching comonomers, such as pentaerythritol or pyromellitic dianyhdride; and/or mixtures thereof. Preferably, isophthalic acid comonomer may be contained in the polyester. Said comonomers may be contained in an amount of up to about 20 mole percent, preferably about 1 to about 10 mole percent or about 1 to about 5 mole percent.

Suitable polyester has a molar mass that results in a melt viscosity that allows easy and stable extrusion, and which results in a desired level of mechanical properties of products. Typically, an indication for the molar mass of polyesters is derived from measuring the viscosity of diluted solutions; for example expressed as Intrinsic Viscosity (I.V.). Suitable polyesters have an I.V. in the range of about 0.5 dL/g to about 2.5 dL/g. A lower I.V. is preferred as it speeds up the selective-area crystallisation of the type required for embrittlement. However, the I.V. should not be so low that it creates too much sag during the heating of the sheet before thermoforming. The skilled person will therefore optimise the I.V. to get good thermoformability and rapid selective-area crystallisation of the type required for embrittlement. Thus, I.V. is preferably at least 0.50, 0.55, 0.6, 0.65 or even 0.7 dL/g, and/or at most 2.0, 1.8, 1.5, 1.2 or 1.0 dL/g, measured in phenol-1, 2 dichlorobenzene, at 25 degrees centigrade. Particularly preferably, the I.V. is 0.6-1.5 dL/g, most preferably the I.V. is 0.7-1.0 dL/g.

Preferably, the polyester according to the present invention is a polyethylene terephthalate (PET), polyethylene naphthalate (PEN), polybutylene naphthalate, polypropylene naphthalate, and their copolymers, and among them, polyethylene terephthalate homopolymer and copolymers are particularly preferred.

Copolymers that contain at least 50 mole percent and preferably, at least 70 mole percent or even at least 80, 90, 95 or 98 mole percent of the ethylene-terephthalate repeating units may be also employed in the tape according to the invention. A suitable example is the standard bottle grade PET copolymers. Also, blends of various polyesters, such as copolymers of ethylene terephthalate with different comonomers having different intrinsic viscosities may also be used, if they can be made to crystallise spherulitcially from the amorphous state. For instance, a blend comprising about 50 wt percent PET homopolymer and about 50 wt percent copolymer of PET containing 2 wt percent isophthalic acid comonomer may also be applied. Recycled polyesters or blends of polyesters, e.g. virgin PET with a recycled polyester, e.g. recycled PET may also be used in the tape according to the present invention, as the cost decreases. Particularly, a blend composition comprising PET homopolymer in an amount of from 50 wt percent to 99 wt percent and recycled PET in an amount of from 1 wt percent to 50 wt percent can be used in present invention, the amount of each blend component depending on the desired properties of the product obtained. The recycled PET having an I.V. of at least 0.70 dL/g may be generally derived from recycled PET bottle flakes, and may contain for example isophthalic acid or 1, 4-cyclohexane dimethanol comonomer in various amounts, such as of from 0.3 wt percent to 3 wt percent. Most preferably, the polyester is a polyethylene terephthalate homopolymer due to its low cost and good mechanical properties, such as high mechanical strength and low shrinkage. The PET homopolymer is generally known to be made by polycondensation of terephthalic acid and ethylene glycol comonomers and may contain less than about 3 wt percent diethylene glycol comonomer formed in situ, preferably less than 1.5 wt percent.

The polyester in the sheet according to the present invention may be produced by any method known in the art, such as by polycondensation. Esterification and polycondensation steps in such polycondensation reaction may be conducted at temperatures known to a skilled man; for example, PET esterification will be typically performed at about 230 to about 260 degrees centigrade and PET polycondensation may be conducted at a temperature from about 270 to about 290 degrees centigrade under reduced pressure. The polycondensation may be conducted in a split operation, for example by employing first a melt-phase polycondensation step and a subsequent solid-phase or solid-state polycondensation step (SSP). The polycondensation reaction may be performed by any conventional route, such as solution polycondensation and melt polycondensation. Preferably, polycondensation is conducted in the melt phase under high vacuum in a batch process, until a desired intrinsic viscosity of the precursor polyester is obtained, in case of PET for example of about 0.55 to about 1 dL/g; preferably about 0.55 to about 0.75 dL/g; and more preferably from about 0.60 to about 0.65 dL/g. More preferably, polycondensation is conducted in the melt phase in a continuous process using a train of reactors in series for esterification and polycondensation. In a continuous PET process, for example, the ethylene glycol generated in the reaction can be optionally condensed and added back into the process.

A solid-state polycondensation (SSP) step may be conducted by applying any known techniques, for example it may be performed batch wise or in a continuous operation. The precursor polyester from melt polycondensation, typically having an I.V. of about 0.65 dL/g, may be granulated or pelletized in any size and shape, and—preferably after crystallizing the pellets—may be subjected to solid-state polycondensation at a temperature between the glass transition temperature and the melting point of the polymer, thereby increasing the intrinsic viscosity of the polyester; in case of PET typically to a value of about 0.72 to 0.84 dL/g. The SSP may be conducted in vacuum or by passing an inert gas stream like a nitrogen stream through the bed of pellets or granules, at a temperature in a range of about 180 to 230 degrees centigrade. Various solid stating processes are known in the art; such processes are for instance described in U.S. Pat. No. 4,064,112 and U.S. Pat. No. 4,161,578.

Other Components

The sheet may comprise components other than polyester. Preferably, the amount of polyester used in the sheet according to the invention is at least 95 wt %, at least 97 wt %, at least 99 wt % or 100 wt %, based on the total composition. The other components which may be present in the sheet may be any conventional additives as known to the skilled person, like stabilizers, such as heat-stabilizers, anti-oxidants, and ultraviolet light stabilizers; processing aids such as lubricants and anti-blocking agents; and colorants, both pigments and dyes; opacifiers; compatibilisers, such as a copolymer of ethylene, acrylic acid ester and maleic anhydride or glycidyl methacrylate; catalyst residues may also be present. Such components may be added with the polyester, at any time and in any order. Generally, each of such additives is used in an amount of some tenths of a percent up to some wt percent; the sheet typically contains at most 5 wt percent of customary additives, preferably at most about 4 wt percent, 3 wt percent, 2 wt percent or even 1 wt percent.

The polyester sheet according to the invention may comprise additives to increase brittleness. For example, the polyester sheet may comprise mineral fillers. However, too large an amount of the mineral fillers would induce haze and/or colour and decrease thermoformability, as well as adding expense. Hence, the polyester sheet may comprise 0-5 wt % of mineral fillers. The present invention also relates to the polyester sheet comprising no or little amount of mineral fillers, for example less than 3 wt %, less than 1 wt %, less than 0.5 wt %, less than 0.1 wt % or 0% of mineral fillers.

Preferably, the polyester sheet according to the invention comprises little or no polymeric additives.

Preferably, the polyester sheet according to the invention comprises little or no polycarbonate (PC). The addition of 1-5 wt % of PC to PET leads to domains of PC well bonded to PET making the sheet tougher. Preferably, the polyester sheet according to the invention comprises less than 1 wt %, less than 0.5 wt %, less than 0.1 wt % or 0% of polymeric additives for example polycarbonate.

Preferably, the polyester sheet according to the invention comprises little or no linear low density polyethylene (LLDPE). The addition of 1-5 wt % of LLDPE to PET leads to polyolefin domains which tend to debond from the PET matrix. This blend is also translucent and tough. Preferably, the polyester sheet according to the invention comprises less than 1 wt %, less than 0.5 wt %, less than 0.1 wt % or 0% of LLDPE.

Addition of 1-5% of a brittle amorphous polymer such as GPPS to PET leads to de-bonded domains of GPPS. The sheet is transparent enough, but surprisingly the GPPS does not induce brittleness and snappability in the sheet on folding. Hence, the polyester sheet according to the invention may comprise GPPS, but for economic reasons, comprise little or no GPPS. For example, the polyester sheet according to the invention comprises less than 1 wt %, less than 0.5 wt %, less than 0.1 wt % or 0% of GPPS.

Nucleating Agent

The sheet according to the invention may further comprise a nucleating agent to make the spherulitic crystallisation for selective area embrittlement faster. The amount of the nucleating agent is preferably selected such that haze is not created in the region outside of the portion where high crystallinity is desired. The amount of the nucleating agent in the composition according to the invention may be e.g. 0.01-0.5 wt %.

Any known nucleating agents may be used, which may be inorganic nucleating agents and organic nucleating agents.

For increasing the crystallization rate of PET, U.S. Pat. No. 4,451,606 discloses an organic nucleating agent, which is a copolymer of poly(alkylene terephthalate) and a sulfonate salt of an aromatic dicarboxylic acid. This organic nucleating agent can be miscible with PET and cause uniform nucleation.

Inorganic nucleating agents to improve PET crystallisation rate have also been reported. As disclosed in U.S. Pat. No. 5,886,088, suitable inorganic nucleating agents include talc, mica, wollastonite, clay, kaolin, diatomaceous earth, bentonite, montmorillonite, hydrotalcite, calcium carbonate, titanium oxide, potassium titanate, asbestos, or barium oxide. The inorganic nucleating agents are less costly, chemically stable, applicable at high temperatures, and of small size to minimize grain radius.

Process

The present invention further provides a method for the manufacture of the sheet according to the invention, comprising the steps of:

(a) providing a starting sheet of polyester, wherein the polyester has a low crystallinity or is amorphous, and (b) locally heating a portion of the starting sheet to a crystallisation temperature allowing the polyester to crystallise, said portion being in the form of a strip.

The skilled person will appreciate that after a desired amount of crystallisation is obtained the heat source used for locally heating the starting sheet is removed and that the locally heated portion is allowed to cool. The cooling can be carried out with or without application of cooling means. For example the cooling can be carried out simply by taking a away the heat the source and allowing the locally heated portion to cool to lower temperature by itself. Alternatively the cooling can be forced by application of a cooling liquid, such as pressurised air or water. Alternatively the sheet may be contacted with cooling rollers so as to cool the sheet.

The term "starting sheet of polyester" is herein meant a sheet of polyester before it is provided with the crystallised portion. The starting sheet has a haze of less than 99% and/or a transmission value of above 50%. Typically the amount of crystallisation is less than 5% or even less than 2% or 1%. Most preferably the starting sheet polyester is amorphous.

The method may further comprise the step of deforming, e.g. by thermoforming, the starting sheet before step (b) and/or deforming, e.g. by thermoforming, the sheet having the crystallised portion after step (b). In some embodiments, the sheet according to the invention is manufactured by thermoforming followed by local heating. In other embodiments, the sheet according to the invention is manufactured by local heating followed by thermoforming. It is also possible that the sheet according to the invention is manufactured by thermoforming followed by local heating followed by thermoforming.

The deforming, e.g. thermoforming, is preferably performed at a temperature above 78° C. but below 150° C. The deforming is performed at such conditions that crystallisation does not occur to an extent that no additional portion is formed having a haze of 99-100% and a transmission value of below 50%. Preferably, the deforming temperature is lower than 100° C. The deforming is preferably performed only at non-brittle portions of the sheet.

The local heating is preferably performed at a temperature of 125-240° C., preferably 140-200° C., more preferably 140-180° C., more preferably 160-180° C. This temperature range is higher than the glass transition temperature of the amorphous sheet and lower than the crystalline melting temperature.

According to the process of the invention, a portion of the starting sheet is locally heated to a crystallisation temperature. During this heating step the sheet is generally not subjected to any mechanical loads, e.g. it is not streched, folded, bent and the like.

The local heating is performed for a period sufficient for the area to be spherulitically crystallized over the whole thickness of the portion. A longer period is necessary for a lower temperature. The required heating time also depends on the sheet thickness. The skilled person can easily determine the required temperature and period for the specific polyester sheet by visually observing the portion and determining whether the portion has turned white, i.e. the portion has attained a haze of 99-100% and a transmission value of below 50%. For example, for sheets having a thickness in the range of 100-5000 μm the local heating may be performed for 40-100 seconds when the heating temperature is 125-155° C., for 25-50 seconds when the heating temperature is 155-175° C. and for 15-50 seconds when the heating temperature is more than 175° C.

It is noted that upon contact heating of the strip, only a small contact pressure is applied. The amorphous PET will soften and become sticky when its temperature reaches 78° C., but as the spherulitic crystallisation occurs, the crystallised region shrinks and stops adhering to the heater and can be released.

The crystallised portion may be provided by first inscribing a groove and locally heating the groove.

The crystallised portion may also be provided by local heating to provide a crystallised portion in the form of a groove.

The local heating may be performed by contact heating e.g. by a heated strip or wire or a hot wheel. The contact heating is preferably performed by an article made of brass. PET melt has a higher sticking tendency to aluminum and steel than to brass, hence for contact heating, brass heaters are more desirable. The local heating may also be performed by non-contact heating, such as printing a laser absorber along an area which is to become the strip and subsequently heating said area with a near infrared laser. Other methods of non-contact heating include hot air nozzle and infrared heater.

In preferred embodiments, the process according to the invention comprises the following subsequent steps:
providing grooves to the starting sheet of polyester,
locally heating the grooves to form the portion(s) of high crystallinity, i.e. the strip(s),
thermoforming the sheet of polyester such that the sheet comprises at least two receiving portions for receiving food and wherein at least two of said at least two receiving portions are separated, at least in part, via the strip of said polyester sheet and
cutting out an area comprising at least two receiving portions.

The invention also relates to the sheet obtainable or obtained by the method according to the invention.

The present invention also provides use of the sheet according to the invention in packaging applications.

The present invention also provides a food packaging obtained by shaping the polyester sheet according to the invention such that the sheet comprises at least two receiving portions for receiving food and wherein at least two of said at least two receiving portions are separated, at least in part, via the strip of said polyester sheet. The number of the receiving portions may preferably be 2, 4, 6 or 8.

The present invention disclosed herein is suitable for packaging of multiple portions of food stuff, in particular yoghurt. It should however be understood that the present invention is not limited to that specific application. Further packaging solutions wherein multiple portions or parts of an article need to be packaged into a single package, yet where the individual portions or parts can be separated from said single package, also fall within the scope of the present invention.

Accordingly the present invention further relates to a packaging comprising at least 2 distinct packaging portions connected via a web of polyester sheet, wherein the web connecting the packaging portions comprises a portion of high crystallinity in the form of a strip, said strip optionally comprising further weakening means, allowing the distinct packaging portions to be separated by snapping the web connecting said packaging portions. It is preferred that the packaging portions comprise the polyester sheet. In other words, it is preferred that the packaging comprises a polyester sheet that is comprised both in the packaging portions and the web connecting said portions.

For example, the sheet according to the invention may also be used for packaging of separable portions of coffee concentrate or coffee powder. For example a series of 4 or more coffee (concentrate or powder) container portions are formed of and held together by the sheet according to the invention such that the strip with high crystallinity allows separating the individual container portions for processing in a suitable coffee making machine. Consequently the present invention also relates to the use of the sheet according to the invention in packaging of coffee container portions, i.e. coffee cups.

Further packaging applications include, but are not limited to the packaging of medicines, toys, (consumer) electronics and the like.

In medical applications the sheet may be used to form a strip of tablets or pills, such that individual portions of tablets or pills can be separated from the strip. Consequently the present invention also relates to the use of the sheet according to the invention in medication packaging.

In packaging of electronics the sheet may be used in a packaging wherein different electronic components are contained in different segments of the packaging. For example, the batteries for an electronic device are contained in a separate segment. Consequently the present invention also relates to the use of the sheet according to the invention in packaging of (consumer) electronics products.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

EXPERIMENTAL

Tests were made on 300 and 800 micron thick transparent APET sheets made from Resin 1 which is a PET homopolymer (homoPET) and I.V. 0.84 dL/g; Resin 2 which is a PET copolymer (co-PET) with 2 wt % isophthalic acid comonomer and I.V.=0.84 dL/g; and Resin 3 which is a co-PET with 2 wt % isophthalic acid comonomer and I.V.=0.76 dL/g, all available from SABIC. The resins were dried for 5 h at 170° C. and extruded at 280° C. using an OCS extruder equipped with a sheet casting die. The sheet was 15 cm wide and was quenched on a chill roll and wound up.

Comparative Example 1

APET sheet was folded and creased. It was not snappable or tearable; the fold became a living hinge. Repeated bending and folding made it tough. Same results were achieved for both thicknesses.

Comparative Example 2

Embrittlement of the APET sheet was attempted by the addition of a brittle polymeric additive to PET upon extrusion of the of the APET sheets using the OCS extruder.

Atatctic polystyrene (SABIC's grade PS 160), which is known to be brittle, was added to PET at a level of 5 wt % during the extrusion. The APET sheet was transparent. Microscopy showed PS domains which were tens of microns in size. The domains were de-bonded from the PET matrix. Folding the APET sheet did not lead to brittle cracking—instead, a living hinge was formed.

Comparative Example 3

Polystyrene was added at a level of 8 wt %. The APET sheet was now slightly hazy. Microscopy showed PS domains which were tens of microns in size. The domains were de-bonded from the PET matrix. Folding the APET sheet still did not lead to brittle cracking—instead, stress whitening occurred and a living hinge was formed, and cracking would not occur despite flexing back and forth.

Example 4

The APET sheet was not folded and creased. A groove was engraved across the sheet with a pin, to direct the crack after embrittlement. The groove area was subjected to thermal crystallisation at 150-170° C. by contact heating. This area became white, while the remainder of the sheet was transparent. Bending of the sheet along the axis of the engraved groove caused cracking along it. Embrittlement occurred with sheets of both thicknesses after similar treatment.

Experiment Set 5

A 10 cm×10 cm transparent APET sheet with a thickness of 800 microns from Resin 2 was scored with a knife to create a weakened groove region to direct the crack. The scored APET sheet did not crack, and bending along the scored line turned it into a living hinge.

The scored sheets were heated in a press between plates at 1 bar pressure to induce spherulitic crystallisation of the sheets.

Unlike example 4, where only a strip of about 3 mm on either side of the groove was crystallised and the rest of the sheet was left amorphous and transparent, the whole area of the 10 cm×10 cm sheet was heated and crystallised (hence, the whole sheet-area was whitened) in this example set.

The whole-area crystallisation as in this experiment set allowed two factors to be tested. The first factor is an assessment of whether the groove helps to direct the crack in a line even when the whole sheet is crystallised. The second factor is an easy assessment of the sticking of the sheet to the metal plate used for contact heating.

Various temperatures and times were employed to find the crystallinity level (density) that would induce cracking upon bending along the scored line. The densities of all the sheets were measured in order to see above what density the sheets became brittle (see Table 1). The density gives the degree of crystallinity according to equation 1. The % haze and % transmission of some of the crystallised sheets in Table 1 were measured according to ASTM D1003, as shown in Table 2.

TABLE 1 correlation of density with snappability of crystallised sheets with a scored groove.

| TEMP ° C. → | 120 | | 150 | | 160 | | 180 | |
|---|---|---|---|---|---|---|---|---|
| TIME sec | Result | Density g/cc | Result | Density g/cc | Result | Density g/cc | Result | Density g/cc |
| 15 | * | * | * | * | * | * | * | * |
| 20 | * | * | * | * | * | * | Brittle | 1.3751 |
| 30 | * | * | Slightly Brittle | 1.3702 | Brittle | 1.3742 | Brittle | 1.3752 |

TABLE 1-continued correlation of density with snappability of crystallised sheets with a scored groove.

| TEMP ° C. → | | 120 | | 150 | | 160 | | 180 |
|---|---|---|---|---|---|---|---|---|
| TIME sec ↓ | Result | Density g/cc | Result | Density g/cc | Result | Density g/cc | Result | Density g/cc |
| 45 | * | * | Brittle | 1.3728 | Brittle | 1.3754 | Brittle | 1.3781 |
| 60 | Transparent, does not break | 1.3348 | Brittle | 1.3750 | # | # | # | # |
| 90 | Slight Haze, does not break | 1.3367 | Brittle | 1.3745 | # | # | # | # |

TABLE 2 correlation of optical properties with snappability.

| Crystallisation conditions | Optical properties | Value | Snappability |
|---|---|---|---|
| 120° C. for 60 s | Haze % | 12.4 | No |
| | Transmittance % | 89.3 | |
| 120° C. for 90 s | Haze % | 33.5 | No |
| | Transmittance % | 83.8 | |
| 150° C. for 30 s | Haze % | 100 | Yes, but less brittle |
| | Transmittance % | 41.5 | |
| 150° C. for 45 s | Haze % | 100 | Yes |
| | Transmittance % | 42.6 | |
| 180° C. for 20 s | Haze % | 100 | Yes |
| | Transmittance % | 40.5 | |

The whole crystallised sheet became brittle. When no groove was present, the crystallised sheet snapped on bending, but in an irregular manner.

Table 1 shows the density above which the sheet becomes brittle; that is, when it could be cracked easily along the groove when bent along it.

The statement 'brittle' in Table 1 indicates the sheet cracked cleanly along the scored line when bent. Above a density of about 1.3720 g/cm³ (corresponding to a crystallinity of 34% from equation 1), the sheet cracked along the scored line. The * in Table 1 indicates the sheet was too tough and would not break on bending; these were not sufficiently crystallised. The density of these APET sheets was less than 1.3367 g/cm³. The # in Table 1 indicates that the experiment was not done for longer times such as 60 and 90 s at 160 and 180° C., but the sheet is expected to become white and brittle, as it does under shorter times at these temperatures.

These results correlate with the optical properties as shown in Table 2.

It can be observed that the density and crystallinity are controlled by the heating temperature and the heating time. It was also observed that without scoring the sheets, the sheets with a density above 1.3720 g/cm³ corresponding to a crystallinity of 34% would crack on bending, but the crack would not be linear but would be jagged or zigzag.

The 800 micron thick sheets where the spherultic crystallisation is complete (that is, enough to be embrittled), the haze is 100% and the light transmission is reduced to about 40%, and these are snappable by bending along the groove (see Table 2).

Heating APET sheet with contact to a surface would induce some sticking above the Tg, until the material crystallises. It was found that the PET sheets do not stick to the heating plates after crystallisation if only a contact pressure or low pressure is used. When the sheet crosses the $T_g$, some sticking would occur. As spherulitic crystallisation occurs, some shrinkage occurs and the crystallised PET sheets do not stick to the plates.

PET melt has a higher sticking tendency to aluminum and steel than to brass. Hence for contact heating, brass heaters are better than aluminum and steel.

The invention claimed is:

1. A polyester sheet comprising a crystallised portion, said crystallised portion being in the form of a strip extending along at least a portion of the polyester sheet.

2. The sheet according to claim 1 wherein the crystallised portion has a haze of 99-100% and a transmission value of below 50% and the sheet further has a portion which has a haze less than 99% and/or a transmission value of at least 50%, wherein the haze and the transmission is measured according to ASTM D1003.

3. The sheet according to claim 1 wherein the crystallised portion has a width of 0.1-10 mm.

4. The sheet according to claim 1 wherein the crystallised portion forms a groove in the sheet or the crystallised portion is provided with weakening means selected from the group consisting of perforations, scores, grooves and combinations of the foregoing weakening means.

5. The sheet according to claim 1 wherein the crystallised portion has a thickness of about 100-2000 μm, which is equal to or less than the thickness of the sheet.

6. Food packaging obtained by shaping the polyester sheet according to claim 1 such that the sheet comprises at least two receiving portions for receiving food and wherein at least two of said at least two receiving portions are separated, at least in part, via a strip of said polyester sheet.

7. The sheet according to claim 1, wherein the polyester has an intrinsic viscosity of 0.7-1.0 dL/g, wherein the crystallised portion has a width of 0.1-5 mm.

8. The sheet according to claim 1 wherein the polyester is a polyethylene terephthalate homopolymer or copolymer.

9. The sheet according to claim 1 wherein the polyester has an intrinsic viscosity of from 0.5-2.5 dL/g.

10. Method for the manufacture of the sheet according to claim 1, comprising:

(a) providing a starting sheet of polyester, wherein the polyester has a low crystallinity or is amorphous, and (b) locally heating a portion of the starting sheet to a crystallisation temperature allowing the polyester to crystallise, said portion being in the form of a strip.

11. The method of claim 10, wherein the heating is performed by contact heating such as by a heated strip or wire, or a hot wheel, or
non-contact heating by printing a laser absorber along an area which is to become the strip and subsequently heating said area with a near infrared laser, or by a hot air nozzle or infrared heater.

12. The method of claim 10, further comprising the step of thermoforming the starting sheet before step (b) and/or thermoforming the sheet having the strip after step (b).

13. The sheet obtained by the method according to claim 10.

14. The method of claim 10 wherein the local heating is performed at a temperature of 125-240° C.

15. The method of claim 14, wherein the local heating is performed at a temperature of 140-180° C.

16. A packaging comprising at least 2 distinct packaging portions connected via a web of polyester sheet, wherein the web connecting the packaging portions comprises a portion of high crystallinity in the form of a strip extending along at least a portion of the polyester sheet, allowing the distinct packaging portions to be separated by snapping the web connecting said packaging portions.

* * * * *